United States Patent [19]

Young et al.

[11] 4,259,703
[45] Mar. 31, 1981

[54] MAGNETO RESISTIVE MAGNETIC TRANSDUCERS

[75] Inventors: Ian R. Young, Sunbury-on-Thames; Ramesh Mistry, Greenford, both of England

[73] Assignee: EMI Limited, Hayes, England

[21] Appl. No.: 46,850

[22] Filed: Jun. 8, 1979

[30] Foreign Application Priority Data

Jun. 20, 1978 [GB] United Kingdom ............... 27338/78

[51] Int. Cl.³ .......................... G11B 5/12; G11B 5/47
[52] U.S. Cl. ...................................... 360/113; 360/66
[58] Field of Search ..................... 360/113, 110, 66–67

[56] References Cited

U.S. PATENT DOCUMENTS

| | | | |
|---|---|---|---|
| 3,814,863 | 6/1974 | O'Day et al. | 360/113 |
| 4,075,671 | 2/1978 | Cheatham | 360/113 |
| 4,141,051 | 2/1979 | Kuijk et al. | 360/113 |
| 4,191,977 | 3/1980 | Lewkowicz | 360/66 |

FOREIGN PATENT DOCUMENTS 1063037 3/1967 United Kingdom .
1540537 2/1979 United Kingdom .

*Primary Examiner*—John H. Wolff
*Attorney, Agent, or Firm*—Fleit & Jacobson

[57] ABSTRACT

A magneto resistive transducer arrangement in which a magneto resistive transducer element is biassed by a periodic bidirectional magnetic field. A lack of coincidence between a minimum in the resistance of the element and a zero in the biassing field indicates the presence of an external field. The arrangement may be used for recovering information in a magnetisable record medium.

8 Claims, 6 Drawing Figures

MAGNETO RESISTIVE MAGNETIC TRANSDUCERS

This invention relates to magneto resistive transducers.

A magneto resistive transducer is a device whose resistance varies with applied magnetic field and, as is well known, this variation follows a square law characteristic. In particular a magneto resistive transducer in the form of a magnetic replay head can be used to sense a variation of remanent magnetisation along a magnetic record medium, such as a tape or document. Such transducers have the advantage over conventional ring/gap heads that their output is dependent not on the rate of change of flux (i.e. the rate at which the recorded information is read) but on the magnitude of the applied magnetic field (i.e. the field recorded in the medium).

One form of magneto resistive replay head is described in UK Pat. No. 1,162,107 (equivalent to U.S. Pat. No. 3,493,694). Using this head the change of resistance is detected as a change in the energising current through a magneto resistive element and a series transistor. A biassing field, which is either a.c. or d.c. providing the energising current is appropriately a.c. or d.c., is applied to be uniform across the element so that the change in its resistance, due to the application of a magnetic field, occurs on the more linear part of the resistance/field characteristic. The actio of d.c. biassing and d.c. energisation is described in the above mentioned specification, and the action of a.c. biassing and a.c. energisation is described, for example, in PROC IEEE March/April 1965 Audio Transactions, p41–43, by Sua-For Sun. It is found in practice that transducers used in this way tend also to be sensitive to changes of temperature, and do not provide an indication of the direction of the detected magnetic field.

It is an object of the present invention to provide an improved form of magneto resistive transducer arrangement.

Accordingly the invention provides a magneto resistive transducer arrangement comprising, a magneto resistive transducer element, means for biassing the element with a periodic bidirectional time swept magnetic field causing a variation in its resistance, means for detecting a minimum in the resistance, and means for indicating whether or not a detected minimum is substantially coincident with a zero in the biassing field.

The presence of an externally applied magnetic field, due to the remanent magnetisation of a magnetic tape or document, for example, is indicated by a lack of coincidence between a detected minimum and the zero in the biassing field.

Preferably the indication means generates a signal indicative of the size of the interval between the detected minimum and the zero closest thereto. Measurements have suggested that the size of this interval is proportional to the magnitude of the applied magnetic field. Futhermore the direction in which a detected minimum is shifted (i.e. whether it occurs before or after the zero of the biassing field) depends on the relative senses of both the applied field (due to a magnetic recording, say) and the sense of the biassing field at the zero. (i.e. whether the biassing field is increasing or decreasing with time in the sense of the applied field). If the sense of the biassing field is known, therefore, the sense of the applied field can be deduced.

Preferably the signal indicative of the interval between the detected minimum and the zero is a rectangular wave synchronised with said biassing field and having a pulse width different from half the period of said biassing field by an amount equal to said interval.

The biassing field may have a ramp waveform, which may be generated by digital to analogue conversion of a square wave.

Particularly when the arrangement is used for reading recordings on a magnetic tape or document the magneto resistive transducer element may be magnetic replay head.

The arrangement may also comprise, spaced from said element, a further magneto resistive transducer element also arranged to be biassed by said periodic time swept magnetic field, a further detection and indication means for said further element, and means for comparing the signals simultaneously received from the respective indication means, and for providing an output representative of that comparison.

This arrangement is particularly useful for reading a magnetic recording when double frequency coding is used. If the two elements are spaced by one bit period then a binary "1" or "0" is indicated depending on whether the signals from the indication means are respectively the same or different.

In order to maintain the position of te detected minimum as close as possible to the centre of the biassing signal the biassing signal may be appropriately adjusted.

In an arrangement adapted to perform this adjustment the signal from the indication means may be used to generate a further biassing field for the element, which further biassing field is of such a strength and direction as to substantially reduce the said interval, provided there is no other change of externally applied field.

Embodiments of the invention will now be described with reference to the accompanying drawings in which.

Figure 1:
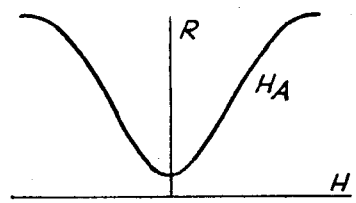
FIG. 1 shows the variation of resistance, R, with applied field, $H_A$ of a magneto-resistive transducer element.

Referring first to FIG. 1 this shows that the resistance, R, of a magneto-resistive element has a minimum value in the absence of an applied magnetic field. The resistance rises with applied field, of either sense or direction, along a square law characteristic, to a maximum value at which magnetic saturation occurs, usually at some hundreds of oersteds.

If the field, $H_T$, from a magnetic tape, for example, which may be only a few tens of oersteds, is considered, only a small change in resistance will be achieved when this is applied directly.

As explained above a bias has hitherto been used to move the interaction point onto the most linear part of te curve in FIG. 1 and this produces an analogue output signal.

Figure 2:
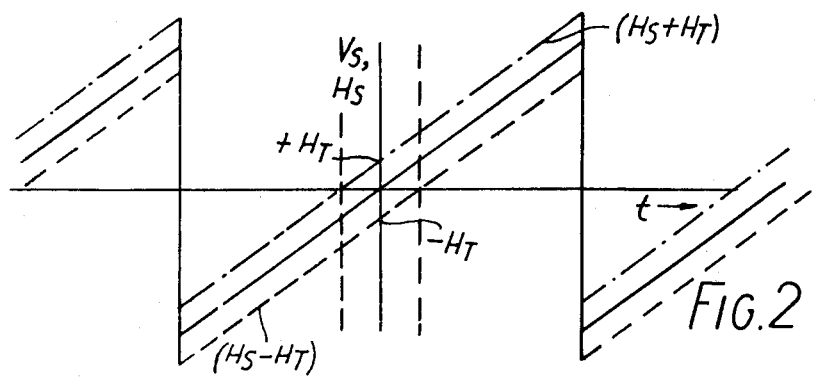
FIG. 2 shows the time variation of a sensitising signal, $V_s$, of a ramp waveform applied as a magnetic biassing field, $H_s$, adjacent a head element. The effect of additional fields, $\pm H_T$, is also shown.

The present invention does not bias the material to such an interaction point but makes use of the minimum in the characteristic. In FIG. 2 the full-line curve shows the voltage waveform, $V_S$, against time, t, of a sensitising signal, S. This voltage produces a corresponding biassing magnetic field, value $H_S$, which is applied in the circuitry of a magneto resistive head. The exact form of the head is not significant at this point but suitable forms are described in, inter alia, U.S. Pat. No. 3,493,694 referred to above. The biassing field is directed having regard to the longitudinal or vertical alignment of the head and the recorded field, $H_T$, on the medium to be examined by the head. The record field, $H_T$, depending on its sign, advances or retards the phase of the biassing field at the instant in time when the recorded field is present adjacent the head.

These waveforms are represented as steady-state conditions $(H_S+H_T)$ and $(H_S-H_T)$ in FIG. 2 by chain-dotted and by dash lines respectively. In a dynamic condition the flyback of the waveform, $V_S$ or $H_S$, occurs at fixed points in time set by the generator of waveform, $V_S$.

Figure 3:
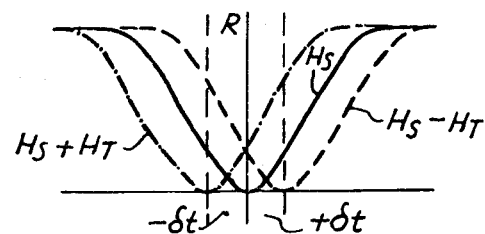
FIG. 3 shows the output from the head element when subjected to the biassing waveform alone and when subjected also the additional fields $\pm H_T$.
Figure 4:
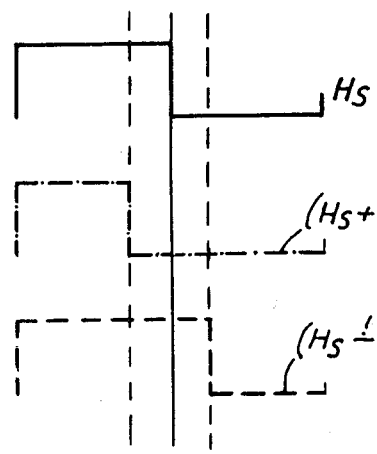
FIG. 4 shows a digital signal waveform derived from the output waveform of FIG. 3.

The value of R will therefore change with the time elapsed along the waveform of $V_S$ between two extremes in dependence on the pesence of field, $H_T$, and its sign, and the minimum in the resistance characteristic is shifted in time by the presence of $\pm H_T$ by an amount dT, as shown in FIG. 3. The movement of the minimum of R can be represented as a change of mark/space ratio of a rectangular waveform synchronised with the signal used to generate the biassing field, $H_S$, as shown in FIG. 4. A rectangular waveform of this kind can be generated by firstly determining the position of the resistance minimum, using peak detectors and comparing the occurence of this minimum with a signal synchronised with the biassing field. A counter then generates an error signal representing the time interval between the start of a cycle of the biassing field and the occurrence of the resistance minimum, and this error signal is fed to a peak value clamp which generates a pulse of the form shown in FIG. 4.

The width of this pulse is controlled by the sense and magnitude of the shift of the minimum away from the zero of the biassing field. It is also possible, by a similar technique, to generate a signal representing the time interval between the minimum of the resistance and the zero of the biassing field, and measurements have suggested that the size of this interval is directly proportional to the magnitude of the applied field (from a magnetic tape, say).

The greater the biasing field amplitude sweep the sharper the minimum. Clearly though the biassing field should have a maximum amplitude greater than the signal to be detected.

Figure 5:
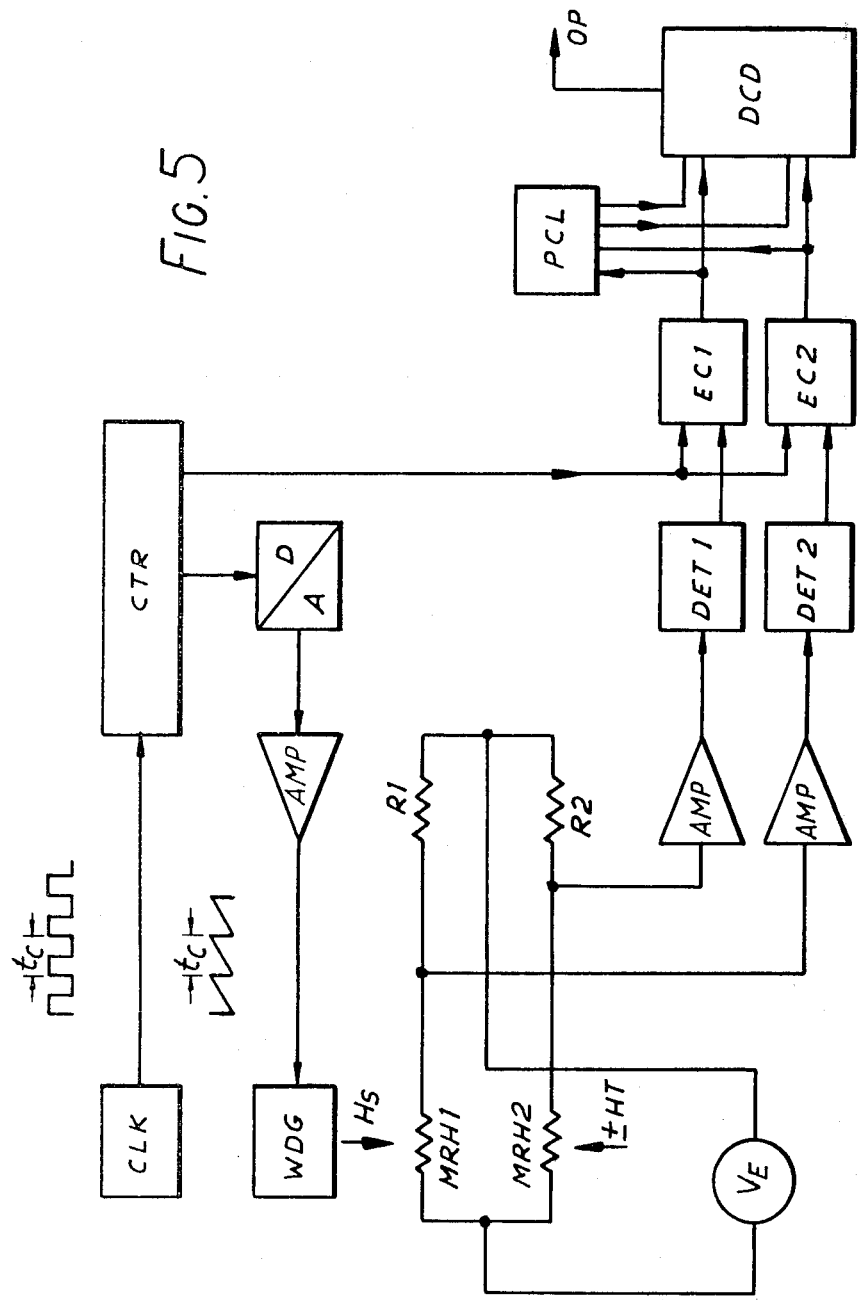
FIG. 5 shows a particular arrangement which uses the techniques illustrated in FIGS. 1 to 4.

FIG. 5 shows in block schematic form a particular arrangement, which uses the techniques described above, and is particularly useful for reading a magnetic record tape, which may be of the permanently structured type, as described in UK Pat. No. 1331604, (U.S. Pat. No. 4023204), or of the conventional erasably recorded type.

A magneto resistive head is formed by resistors MRH1 and 2, provided with respective series resistors R1 and R2. The network of MRH1 and 2 and R1 and R2 is energized by a source of d.c. voltage, $V_E$, which is a constant current sorce. A clock signal sorce, CLK, energises a counter CTR to establish a time scale for the reading operation of the head. A digital/analog converter, D/A, produces a sawtooth waveform of the same p.r.f. as the clock signal which is applied to a winding WDG, adjacent the head elements MRH1 and 2, to produce a uniform, time varying field, $H_S$, having a ramp waveform as described above. The field, $H_T$, from the tape is also arranged to act on head elements MRH 1 and 2 as shown.

The resistance of head elements, MRH 1 and 2, is thus caused to vary with time as described above and as illustrated in FIGS. 1 to 4, and thus adjust the mark/space ratio of the waveform of the voltage across them. The waveform variation from each head is amplified at AMP, as required, and applied to peak detectors, DET 1 and DET 2. The derived signals are then applied to error counters, EC 1 and EC 2, operated by counter, CTR. THus the time interval between the start of the biassing period and the occurence of a minimum in the resistance is determined, and a signal indicative thereof is passed to peak value clamps, PCL, which control a decoder, DCD. When conventional double frequency coding is used the head elements are spaced by the nominal bit length so that a substantially identical mark/space from each head is recognised by the decoder as a binary ONE and a different mark/space from each head is recognised as a binary ZERO, as is well-known in the art.

Figure 6:
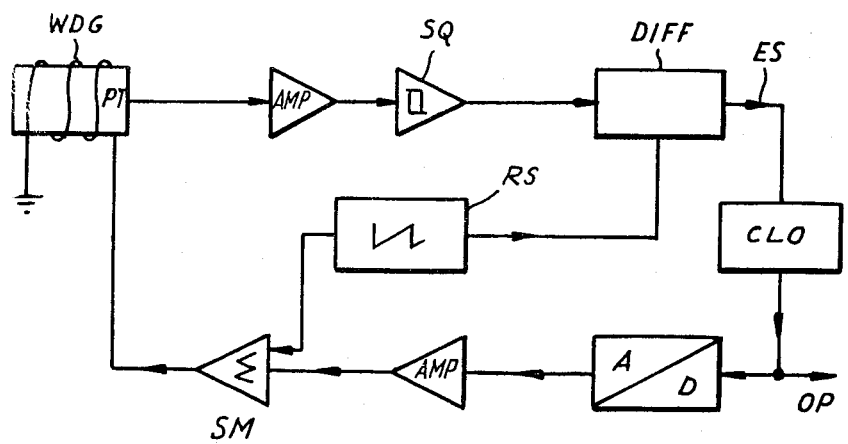
FIG. 6 shows a circuit of a modification of the above arrangements.

As mentioned above the sharpness of the minimum in the resistance characteristic can be affected by the degree of the biassing field sweep. In a modification therefore the amplitude is varied from a large search amplitude to a small, measuring, amplitude with an appropriate d.c. bias to centralise the measuring amplitude on the minimum discovered in the search mode. In another modification the biassing field is controlled by a feed back loop to keep the long term position of the resistance minimum substantially constant. FIG. 6 shows a circuit for this modification. The coil, WDG, used to generate the biassing field is wound around the magneto resistive elements MRH1, 2, to form a probe tip, PT. The output from the elements is amplified and squared at squarer, SQ. The signal from ramp source, RS, is compared with the squared output in a difference circuit, DIFF, to produce an error signal. ES, indicative of the departure of the resistance minimum from coincidence with the zero of the biassing field. This error signal is fed to a capacitive clamp circuit, CLO, which provides the output waveform, and also, by means of digital to analogue converter, D/A, and summer, SM, effects a change in the biassing field sufficient to centralise the position of the minimum.

The arrangements described above permit the application of magneto-resistive heads to digital read-out equipment particularly for the read-out of binary or like digital information from permanently structured magnetisable material layers, such as those formed by selective alignment of layers of alignable magnetic material. Furthermore such a readout is substantially insensitive to changes of temperature. Magneto-resistive heads have an advantage over conventional coil and gapped-ring laminated heads as any shape of head can be formed by deposition and etching technique, whereas a laminated head gap of other than straight-across form requires expensively prepared, specially shaped and stacked, laminations. A head suitable for reading a record format of the type described in U.S. Pat. No. 4,023,204, for example, while producable in a laminate form, can be more easily produced in magnetoresistive deposited form as a substrate and the above described techniques show how an effective output signal can be attained. Furthermore the speed of the record medium/head transport does not matter. This is particularly important with regard to point-of-sale, cash dispenser, magnetic lock and other read-out devices for credit cards, cheques, notes, cash cards and identity documents which are relatively small and do not always attain a steady transport speed. Such advantages are also apparent when probes or wands are required for reading labels on sacks and the like.

What we claim is:

1. A magneto resistive transducer arrangement comprising, a magneto resistive element, means for biassing the element with a periodic, time swept magnetic field exhibiting positive and negative excursions of equal amplitude about a preset reference level of zero magnitude, means for applying an electrical input signal to said element, monitoring means for sensing an output signal from said element indicative of its electrical resistance and for detecting a minimum in the electrical resistance, and an output means for generating a signal for indicating whether or not a detected minimum in the electrical resistance occurs when the magnitude of the biassing field is uniquely equal to said preset, zero reference level.

2. A magneto resistive transducer arrangement according to claim 1 wherein said output means comprises means for determining a time interval between attainment by the biassing field of said zero reference level and the occurrence of the corresponding minimum in the electrical resistance of the element, and means for generating a signal indicative of a determined time interval.

3. A magneto resistive transducer arrangement according to claim 2 wherein the means for generating said signal indicative of a said time interval comprises means for generating a square wave synchronised with the biassing field and means for modulating the width of the square wave in accordance with the determined time interval.

4. A magneto resistive transducer arrangement according to claim 2 wherein the means for biassing the element comprises means for generating a time varying magnetic field of a periodic ramp waveform.

5. A magneto resistive transducer arrangement according to claim 4 wherein the means for generating said time varying magnetic field of periodic ramp waveform comprises means for generating a square wave, a digital-to-analogue conversion circuit for receiving the square wave and thereby generating a periodic time varying signal of ramp waveform, and field generating means for energisation by said signal of ramp waveform to thereby generate the time varying magnetic field of periodic ramp waveform.

6. A magneto resistive transducer arrangement according to claim 1 comprising,
a further magneto resistive transducer element, also biassed by said biassing means,
means for applying an electrical input signal to said further element, further monitoring means for sensing an output signal from said further element indicative of its resistance and for detecting a minimum in the resistance, and a further output means for generating a signal for indicating whether or not a detectd minimum in the resistance of the said further element occurs when the magnitude of the biassing field is uniquely equal to said preset, zero reference level, the arrangement also including means for comparing signals simultaneously generated by said output and further output means and for indicating whether or not said simultaneously generated signals are the same or different.

7. A magneto resistive transducer arrangement according to claim 2 comprising means for applying said signal, indicative of a time interval, to the said biassing means via a feedback circuit, to thereby generate an additional biassing field which is of such a strength and direction as to reduce a determined time interval.

8. A magneto resistive transducer arrangement according to claim 1 wherein the magneto resistive transducer element is a magnetic replay head.

* * * * *